(12) United States Patent
Nishi et al.

(10) Patent No.: US 12,523,582 B2
(45) Date of Patent: Jan. 13, 2026

(54) MEDIUM FOR SEPARATING AND STORING BLOOD PLASMA OR SERUM, METHOD FOR PRODUCING THE MEDIUM, DEVICE, KIT, AND METHOD FOR MEASURING GLYCATED PROTEIN

(71) Applicant: PROVIGATE INC., Tokyo (JP)

(72) Inventors: Mitsumi Nishi, Tokyo (JP); Noriko Miyauchi, Tokyo (JP); Yuuya Miyazawa, Tokyo (JP)

(73) Assignee: PROVIGATE INC., Tokyo (JP)

( * ) Notice: Subject to any disclaimer, the term of this patent is extended or adjusted under 35 U.S.C. 154(b) by 167 days.

(21) Appl. No.: 18/254,184

(22) PCT Filed: Nov. 24, 2021

(86) PCT No.: PCT/JP2021/043076
§ 371 (c)(1),
(2) Date: May 24, 2023

(87) PCT Pub. No.: WO2022/114031
PCT Pub. Date: Jun. 2, 2022

(65) Prior Publication Data
US 2024/0027313 A1    Jan. 25, 2024

(30) Foreign Application Priority Data
Nov. 25, 2020   (JP) .................................. 2020-195592

(51) Int. Cl.
*G01N 1/40*       (2006.01)

(52) U.S. Cl.
CPC .......... *G01N 1/4005* (2013.01); *G01N 1/4044* (2013.01); *G01N 2001/4016* (2013.01)

(58) Field of Classification Search
CPC ........ A61B 5/150022; A61B 5/150305; A61B 5/150358; A61B 5/150824; A61B 5/151;
(Continued)

(56) References Cited

U.S. PATENT DOCUMENTS 6,008,059 A    12/1999  Schrier et al.
6,197,598 B1 *  3/2001  Schrier ............ G01N 33/54388
                                               436/514

(Continued)

FOREIGN PATENT DOCUMENTS

DE    2551004 A1 *  5/1977  ............. G01N 27/48
JP    H0630791 A    2/1994
(Continued)

OTHER PUBLICATIONS

DE2551004A1 English Translation (Year: 2024).*
(Continued)

*Primary Examiner* — Jennifer Wecker
*Assistant Examiner* — Jonathan Bortoli
(74) *Attorney, Agent, or Firm* — McBee Moore & Vanik IP, LLC

(57) ABSTRACT

According to an embodiment of the present disclosure, a medium with which blood plasma is separated and stored, the medium including a porous medium for separation of blood plasma and a substance supported on the porous medium, the substance that suppresses glycation of a protein by glucose, is provided.

20 Claims, 5 Drawing Sheets

(58) Field of Classification Search
CPC ............... G01N 1/4005; G01N 1/4044; G01N 2001/4016; G01N 2333/765; G01N 2440/38; G01N 33/6827
See application file for complete search history.

(56) References Cited

U.S. PATENT DOCUMENTS

| | | | |
|---|---|---|---|
| 10,799,166 B2 | 10/2020 | Gonzalez-Zugasti et al. | |
| 2005/0255453 A1* | 11/2005 | Qian ................... | G01N 33/526 422/400 |
| 2006/0270060 A1 | 11/2006 | Smith | |
| 2011/0039290 A1* | 2/2011 | Clausen ............... | G01N 33/521 156/60 |
| 2013/0209985 A1* | 8/2013 | Hoke ................... | B01L 3/5021 435/307.1 |
| 2016/0192870 A1* | 7/2016 | Babic ................... | B01L 3/56 427/2.12 |
| 2016/0243262 A1* | 8/2016 | Ortac ................... | C12Q 1/00 |
| 2019/0328953 A1* | 10/2019 | Foucault ............... | A61J 1/2013 |
| 2020/0173909 A1* | 6/2020 | Lee ..................... | G01N 21/75 |

FOREIGN PATENT DOCUMENTS

| | | |
|---|---|---|
| JP | H09166597 A | 6/1997 |
| JP | H10104226 A | 4/1998 |
| JP | H10206298 A | 8/1998 |
| JP | 2001221794 A | 8/2001 |
| JP | 2002022724 A | 1/2002 |
| JP | 2003270238 A | 9/2003 |
| JP | 2006133143 A | 5/2006 |
| JP | 2006254918 A | 9/2006 |
| JP | 2018513363 A | 5/2018 |
| WO | 2004083852 A1 | 9/2004 |
| WO | 2016158733 A1 | 6/2016 |
| WO | 2016156376 A1 | 10/2016 |
| WO | 2018066167 A1 | 4/2018 |
| WO | 2018089315 A1 | 5/2018 |
| WO | WO-2020037269 A2 * 2/2020 ......... A61B 5/14503 |
| WO | WO-2021178935 A1 * 9/2021 ............ C12N 9/0006 |

OTHER PUBLICATIONS

PCT International Search Report for PCT/JP2021/043076, mailed Feb. 15, 2022.
Extended European Search Report, mailed Aug. 22, 2024.

* cited by examiner

MEDIUM FOR SEPARATING AND STORING BLOOD PLASMA OR SERUM, METHOD FOR PRODUCING THE MEDIUM, DEVICE, KIT, AND METHOD FOR MEASURING GLYCATED PROTEIN

CROSS-REFERENCE TO RELATED APPLICATIONS

This application is the National Stage entry of International Application No. PCT/JP2021/043076, filed 24 Nov. 2021, which claims priority to Japanese Application No. 2020-195592, filed 25 Nov. 2020. Each of these applications is incorporated by reference in its entirety.

BACKGROUND

Field of the Invention

The present disclosure relates to a medium with which blood plasma or serum is separated and stored, a method for producing the medium, a device, a kit, and a method for measuring glycated protein.

Description of Related Art

In common mail-order diabetes tests using blood, glycohemoglobin (HbA1c) is measured. However, other glycated proteins present in blood are not measured in mail-order diabetes tests.

In order to prevent hemolysis, liquid blood needs to be mailed within a short period of time or at low temperatures. In another case, it is necessary to centrifuge liquid blood to separate only the serum component. Alternatively, the blood component may be transported after serum and clot have been separated from each other by addition of a separating agent. All of the above approaches require a complex work to be done at the worksite.

In a mail-order test of glycohemoglobin (HbA1c) known in the related art, commonly, a filter paper sheet is soaked in blood and then dried. In the test, the dried blood is dissolved in a buffer and measured by immunoprecipitation.

SUMMARY OF INVENTION

The inventor of the present invention found that albumin present in blood is likely to be glycated and becomes more likely to be glycated in the step of drying the blood component prior to transportation. Accordingly, the inventor of the present invention recognized the need for a storage or transport medium with which a glycated protein can be held over a relatively long period of time during mailing and the glycated protein can be subsequently measured in an appropriate manner.

In some embodiments of the present disclosure, a medium with which blood plasma is separated and stored is provided. In some embodiments, the medium includes a porous medium for separation of blood plasma and a substance supported on the porous medium, the substance that suppresses glycation of a protein by glucose.

According to the above embodiments, for example, the plasma component can be stored and/or transported in an easy, simple, and stable manner.

Still further aspect and advantages of the present disclosure will readily become apparent to those skilled in the art upon reading and understanding the following detailed description, where only illustrative embodiments of the present disclosure are described. As is understood, other embodiments are possible in the present disclosure. Some of the details can be modified in terms of various obvious points without departing from the scope of the present disclosure. Thus, it should be understood that the attached drawings and description are essentially illustrative but not limiting.

DETAILED DESCRIPTION OF A PREFERRED EMBODIMENT

Figure 1:
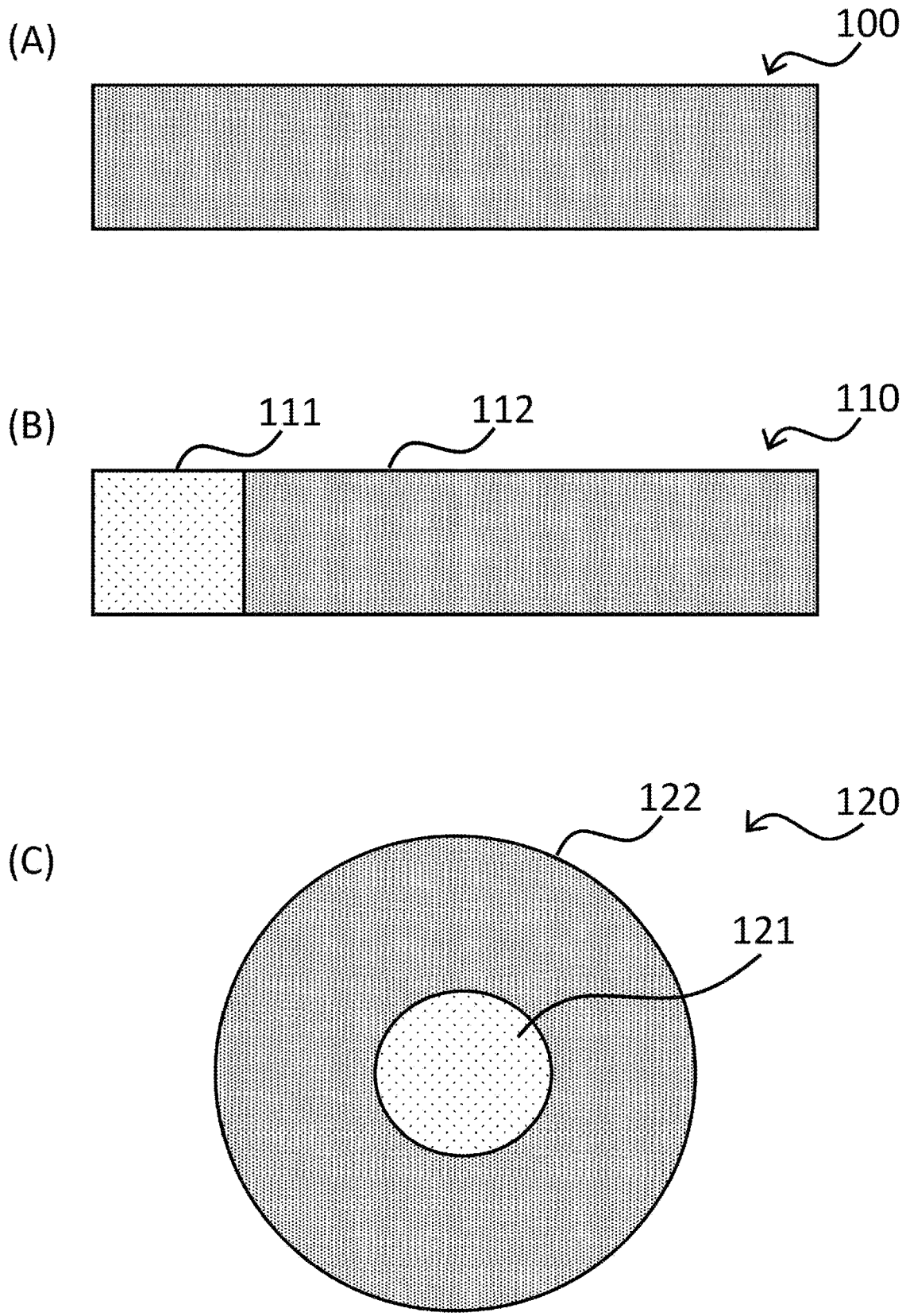
FIGS. 1A to 1C are top views of porous media according to some embodiments.

In some embodiments, the target (subject) may include a human and may be a human. In some embodiments, the target may include an animal other than a human and may be an animal other than a human. The animal other than a human may include a mammal and may be a mammal. Examples of the animal other than a human include, but are not limited to, a working animal, a domestic animal, a pet animal, and a wild animal.

<Medium>

In some embodiments, the medium is capable of separating blood plasma or serum from blood (e.g., whole blood or a solution derived from blood). In some embodiments, the medium is capable of storing blood cells, plasma or serum, or two or more selected from the above components. In some embodiments, the medium can be used for transporting blood cells, blood plasma or serum or two or more selected from the above components.

In some embodiments, the medium may be a porous body, a porous medium, or a porous material. The medium may have through-pores or nonthrough-pores formed therein. The pores may be either continuous pores (formed by a plurality of pores that are in fluid communication with one another) or discontinuous pores (formed by a plurality of pores that are substantially not in fluid communication with one another).

In some embodiments, the porous medium may be a medium made of a fiber. The fiber may be a natural fiber, a chemical fiber, or a composite fiber.

In some embodiments, the porous medium may be composed of cellulose, a glass fiber, a hollow fiber, cotton, nitro cellulose, a polysulfone, or the like. The hollow fiber may be composed of a polyvinyl alcohol copolymer, polymethyl methacrylate, a polymer alloy, or the like. The medium may be a hollow-fiber plasma separation membrane. The porous medium may be soluble in water. For example, water-soluble cellulose may be used.

In some embodiments, the porous medium may be a porous polymer (polymer porous body). The porous medium may have a sponge-like form.

In some embodiments, the porous medium may have the form of a film, a membrane, a test paper, or the like.

In some embodiments, the porous medium may be capable of substantially separating blood plasma. In some embodiments, the porous medium may be capable of capturing a blood cell component, such as red blood cells. A part or the entirety of the porous medium may have an opening size (pore size) smaller than the size of deformed red blood cells. In some embodiments, the porous medium may be formed of a plasma separation filter, a plasma separation membrane, or the like.

The size or minimum size of pores formed in the porous medium may be, for example, equal to or greater than 3, 2, 1, 0.5, 0.3, or 0.1 µm.

In some embodiments, the above pore size may be uniform over the entirety of the medium. In some embodiments, the above pore size may vary in the medium and may be asymmetrical. For example, the opening size may change in the direction in which a solution flows. For example, the minimum pore size may be greater than about 0.1 µm, the pore size may gradually increase, and the maximum pore size may be about 100 µm.

<Protein>

In some embodiments, the target substance included in blood plasma or serum component may be a protein. The protein may be albumin, globulin, or hemoglobin. The glycated protein may be glycated albumin, glycated globulin, or glycated hemoglobin.

<Enzymes, Etc.>

The substance that suppresses glycation of a protein by glucose may be glucose oxidoreductase. The above substance may also be glucose oxidase (GOx), glucose dehydrogenase, or glucokinase. Examples of glucose dehydrogenase include, but are not limited to, UDP-glucose-6-dehydrogenase, glucose-1-dehydrogenase, glucose-6-phosphate dehydrogenase (G6PD), glucose/galactose-1-dehydrogenase, glucose-6-phosphate 3-dehydrogenase, quinoprotein glucose dehydrogenase, and the like.

The medium may further include a cofactor (or coenzyme) for the enzyme which is supported on the medium. Examples of cofactors that can be used for glucose oxidase include electron acceptors such as flavin adenine dinucleotide (FAD) and quinone. Examples of cofactors that can be used for glucose dehydrogenase include electron acceptors such as NAD+, NADP+, FAD, PQQ, PMS, coenzyme 420, and quinone. Examples of cofactors that can be used for glucokinase include ATP and an Mg-ATP complex. Note that the above substances are examples, and the combination of an enzyme and a cofactor is not limited to the above examples.

Various methods can be used for depositing the substance that suppresses glycation of a protein by glucose (hereinafter, also referred to simply as "supported substance"), such as glucose oxidase, on the medium.

In some embodiments, the substance (supported substance) that suppresses glycation of a protein by glucose may be supported on the inner surface of the porous medium. Microscopically, the supported substance may be supported on the inner surfaces of fibers or pores. The plasma component including proteins is absorbed by the porous medium and subsequently adsorbed onto the inner surface of the porous medium (e.g., the surfaces of fibers or pores) upon evaporation of moisture. In this process, the concentration of the component in the solution is increased and, as a result, the likelihood of the proteins coming into contact with glucose is increased. This increases glycation of the proteins unnecessarily. Glucose oxidase or the like supported on the inner surface of the porous medium decomposes glucose in the vicinity thereof. This inhibits or reduces the unnecessary glycation of the proteins by glucose in the porous medium with efficiency.

Various methods can be used for supporting the supported substance on the inner surface of the porous medium. For example, a solution containing the supported substance may be absorbed by the porous medium and drying may be performed subsequently.

In some embodiments, the substance (supported substance) that suppresses glycation of a protein by glucose may be supported on the outer surface of the porous medium. The supported substance may be supported on the outer surface of a porous medium having a film-like or stripe-like shape. Microscopically, the supported substance is not necessarily supported on the inner surfaces of fibers or pores. For example, the supported substance may be supported only on the outer surface of the porous medium but not on the inner surface thereof. For example, the supported substance may be supported only on the surface of the portion to which blood is to be dropped. Alternatively, the supported substance may be disposed at the portion through which blood or plasma is to pass. This enables the supported substance to come into contact with a liquid containing a blood or plasma component with efficiency. In addition, application of the supported substance can be done readily.

Various methods can be used for supporting the supported substance on the outer surface of the porous medium. For example, a solution containing the supported substance may be applied onto the surface of the porous medium by spin coating, an ink jet method, or the like and drying may be performed subsequently.

<Other Supported Substances: Ketoamine Oxidase>

In some embodiments, the porous medium may be used for the measurement or test of hemoglobin A1c. In some embodiments, the porous medium may be provided with ketoamine oxidase, such as fructosyl-amino acid oxidase (FAOD), supported thereon.

Ketoamine oxidase decomposes glycated lysine present in blood. Blood contains glycated amino acids, such as free glycated lysine and glycated valine. Ketoamine oxidase decomposes not only glycated amino acids derived from the glycated proteins that are to be measured (e.g., glycated albumin and HbA1c) but also glycated amino acids that are originally free. Thus, there is a possibility of the measured value being higher than the concentration of glycated amino acids derived from the glycated proteins. Accordingly, in some embodiments, before the glycated proteins are decomposed by protease, the glycated amino acids present in blood, such as glycated lysine and glycated valine, may be decomposed by addition of ketoamine oxidase. This enables the concentration of the glycated proteins to be determined with further accuracy.

In some embodiments, the porous medium may be further provided with catalase supported thereon. A reaction of glucose may involve generation of hydrogen peroxide. Hydrogen peroxide has a property of deactivating ketoamine oxidase. Hydrogen peroxide also has a property of decomposing or modifying the blood components. The catalase decomposes hydrogen peroxide to prevent or reduce the deactivation of the ketoamine oxidase.

<Blood Clotting Inhibitor>

In some embodiments, a blood clotting inhibitor (also referred to as "anticoagulant"; the same applies hereinafter)

may be supported on the porous medium. In some embodiments, a blood clotting inhibitor may be supported inside or included in a blood-collecting vessel. Blood may clot in the case where, for example, the rate at which the blood is absorbed, flows, or is dried is low. The blood clot may reduce the efficiency with which the plasma component is extracted. The blood clotting inhibitor prevents or reduces the blood clot. In some embodiments, the blood clotting inhibitor may be supported on the medium for storing or mailing blood plasma.

<Colorant>

In some embodiments, a colorant may be supported on the porous medium. For example, the colorant may be a water-sensitive substance. For example, the porous medium including the colorant may be a water-sensitive test paper. The colorant may include cobalt chloride. The use of the colorant makes it easy to determine the position the liquid or, in particular, the plasma component having a low contrast level has reached in the porous medium or the amount of the liquid or plasma component held by the porous medium. In other words, it becomes possible to check the amount of blood introduced to the porous medium. The colorant may be a component that substantially does not affect the subsequent measurement of the blood component.

<Other Structures>

In some embodiments, the porous medium may have a structure that allows the porous medium to be cut into pieces after absorbing blood such that the section in which the blood cell component is present and the section in which the plasma component is present are separated from each other. For example, the porous medium may be cut into pieces such that the section that holds the blood cell component is substantially completely included in one of the pieces. The porous medium may also be cut such that the section that holds the plasma component is divided into pieces. For cutting the porous medium, scissors or a cutter may be used. For cutting the porous medium, a structure included in the housing that holds the porous medium (e.g., a cutter included in the housing) may be used. In some embodiments, the porous medium may have a mechanically weak structure formed at the position at which the porous medium is to be cut. For example, the porous medium may have a perforated tear-off strip formed at such a position.

In some embodiments, the porous medium may include a section in which the plasma component is separated and a section in which the substance that suppresses the glycation by glucose is supported. The section in which the plasma component is separated may be formed of a plasma separation filter. The section in which the substance that suppresses the glycation by glucose is supported may not necessarily be capable of separating blood plasma. A part of the section in which the plasma component is to be supported and a part of the section in which the substance that suppresses the glycation by glucose is supported may be in fluid communication with each other. For example, blood may be dropped to the section in which the plasma component is to be supported, only the plasma component is absorbed by the section in which the substance that suppresses the glycation by glucose is supported, and drying may be performed therein. The section in which the plasma component is to be supported and the section in which the substance that suppresses the glycation by glucose is supported may each have a film-like or sheet-like shape. The above sections may be arranged adjacent to each other in the planar direction and may partially overlap each other (horizontal flow). Alternatively, the above sections may be stacked on top of each other in the direction perpendicular to the plane (vertical flow).

Example of Porous Medium-1

FIGS. 1A to 1C are top views of porous media according to some embodiments.

FIG. 1A is a top view of a porous medium 100 according to an embodiment. The porous medium 100 has a stripe-like shape. The entirety of the porous medium 100 is capable of separating blood plasma and supports a substance capable of suppressing glycation of a protein by glucose (hereinafter, also referred to simply as "enzyme").

FIG. 1B is a top view of a porous medium 110 according to an embodiment. The porous medium 110 has a stripe-like shape. The porous medium 110 includes a section (plasma separation section) 111 located at an end or edge thereof, the section 111 being capable of separating blood plasma, and a section (enzyme supporting section) 112 arranged to come into contact with the plasma separation section 111, the section 112 being provided with an enzyme supported thereon. Blood is dropped to the plasma separation section 111 and flows in the longitudinal direction of the stripe. The blood cell component is captured by the plasma separation section 111, while the plasma component is absorbed by and held in the enzyme supporting section 112.

FIG. 1C is a top view of a porous medium 120 according to an embodiment. The porous medium 120 has a circular shape. The porous medium 120 includes a plasma separation section 121 located at the center thereof and an enzyme supporting section 122 arranged to surround the plasma separation section 121. Blood is dropped to the plasma separation section 121 located at the center and flows in the radial direction. The blood cell component is captured by the plasma separation section 121, while the plasma component flows in the radial direction and is absorbed by and held in the enzyme supporting section 122.

Example of Porous Medium-2

FIGS. 2A to 2H are cross-sectional views of porous media according to some embodiments. The shapes of these porous media viewed from top are not limited and may be a stripe-like shape, a circular shape, or the like unless they contradict the illustrations.

Figure 2:
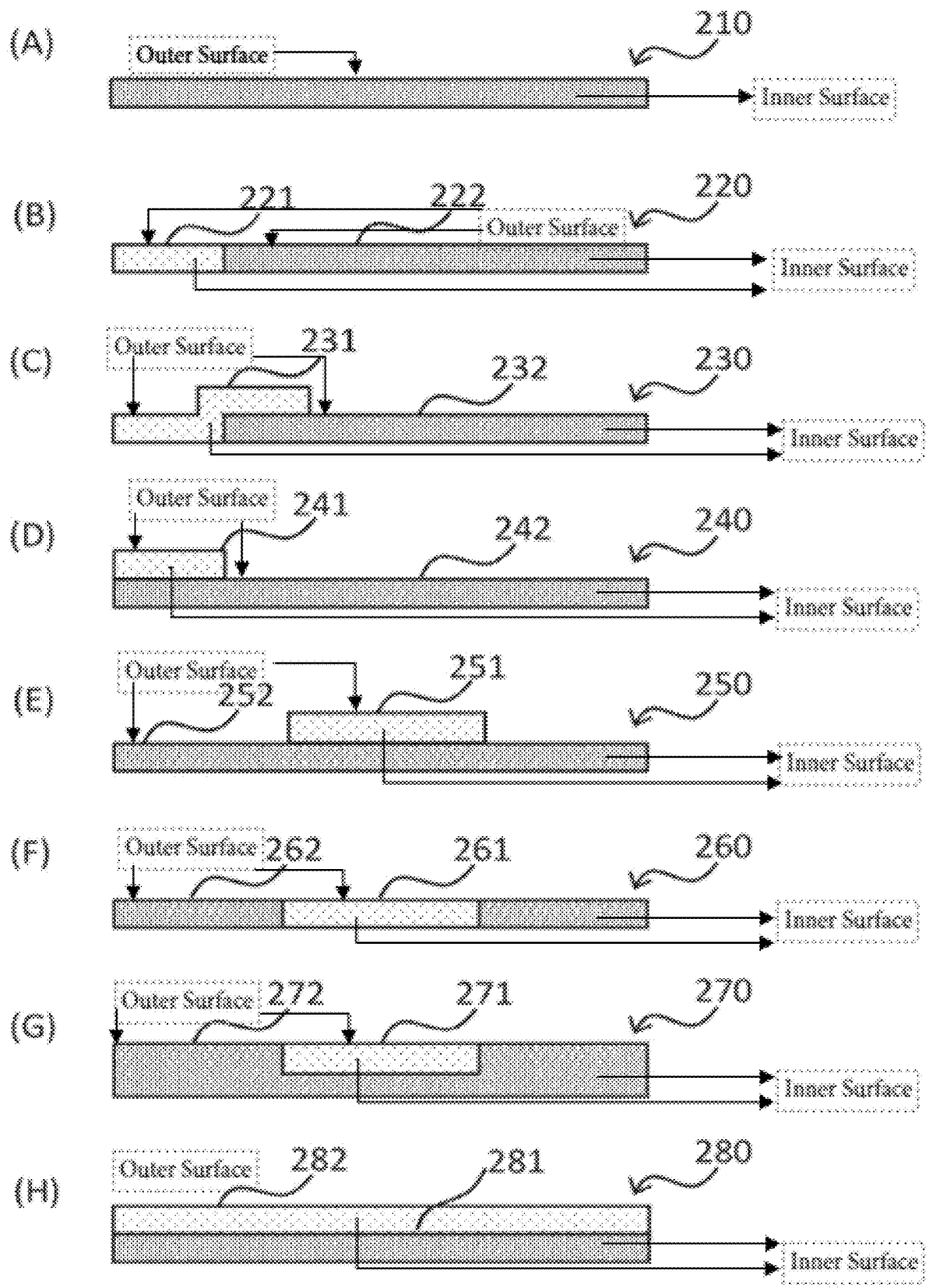
FIGS. 2A to 2H are cross-sectional views of porous media according to some embodiments.

FIG. 2A is a cross-sectional view of a porous medium 210 according to an embodiment. The entirety of the porous medium 210 is capable of separating blood plasma and includes an enzyme supported thereon.

FIG. 2B is a cross-sectional view of a porous medium 220 according to an embodiment. The porous medium 220 includes a plasma separation section 221 located at an end or edge thereof and an enzyme supporting section 222 disposed on substantially the same plane as the plasma separation section 221 and arranged to come into contact with the plasma separation section 221 at the end surface.

FIG. 2C is a cross-sectional view of a porous medium 230 according to an embodiment. The porous medium 230 includes a plasma separation section 231 located at an end or edge thereof and an enzyme supporting section 232 disposed on substantially the same plane as the plasma separation section 231. A part of the plasma separation section 231 overlaps the enzyme supporting section 232. The contact surface between the plasma separation section 231 and the enzyme supporting section 232 is relatively large. This enables the blood component to flow from the plasma separation section 231 to the enzyme supporting section 232 with efficiency.

FIG. 2D is a cross-sectional view of a porous medium 240 according to an embodiment. The porous medium 240 includes an enzyme supporting section 242 and a plasma separation section 241 arranged to overlap an end or edge of the enzyme supporting section 242. Blood is dropped to the plasma separation section 241, and the plasma component reaches the enzyme supporting section 242 in the manner of vertical flow. The plasma component flows inside the enzyme supporting section 242 in the manner of horizontal flow.

FIG. 2E is a cross-sectional view of a porous medium 250 according to an embodiment. The porous medium 250 includes an enzyme supporting section 252 and a plasma separation section 251 stacked thereon at the center (or a position away from an edge) of the enzyme supporting section 252. Blood is dropped to the plasma separation section 251, and the plasma component reaches the enzyme supporting section 252 in the manner of vertical flow. The plasma component flows inside the enzyme supporting section 252 in the manner of horizontal flow in the direction toward the ends or in the in-plane, radial direction.

FIG. 2F is a cross-sectional view of a porous medium 260 according to an embodiment. The porous medium 260 includes an enzyme supporting section 262 and a plasma separation section 261 disposed at the center (or a position away from an edge) of the enzyme supporting section 262 on substantially the same plane as the enzyme supporting section 262. The plasma separation section 261 and the enzyme supporting section 262 are arranged to come into contact with each other at the end surfaces thereof.

FIG. 2G is a cross-sectional view of a porous medium 270 according to an embodiment. The porous medium 270 includes an enzyme supporting section 272 and a plasma separation section 271 disposed at the center (or a position away from an edge) of the enzyme supporting section 272 on substantially the same plane as the enzyme supporting section 272. The plasma separation section 271 does not penetrate through the enzyme supporting section 272 in the depth direction. In other words, the plasma separation section 271 is non-penetrating. Blood is dropped to the plasma separation section 271 and flows in the manner of both horizontal and vertical flows and, as a result, the plasma component reaches the enzyme supporting section 272. The plasma component flows inside the enzyme supporting section 272 primarily in the manner of horizontal flow in the direction toward the ends or in the in-plane, radial direction. Part of the plasma component may flow in the manner of vertical flow.

FIG. 2H is a cross-sectional view of a porous medium 280 according to an embodiment. The plasma separation section 281 and the enzyme supporting section 282 are stacked on top of each other. Blood is dropped onto the upper surface of the plasma separation section 281 and flows in the manner of vertical flow and, as a result, the plasma component reaches the enzyme supporting section 282. The plasma component may further flow inside the enzyme supporting section 282 in the manner of vertical flow. The plasma component may flow inside the enzyme supporting section 282 in the manner of horizontal flow in a direction parallel to the stacking plane.

<Production Method>

In some embodiments, the medium with which blood plasma is separated and stored can be produced by applying a solution containing a substance that suppresses glycation of a protein by glucose (e.g., glucose oxidase solution) to a porous medium capable of separating blood plasma (e.g., plasma separation filter) or causing the porous medium to absorb the solution and subsequently drying the porous medium.

In some embodiments, the porous medium may be impregnated with a solution containing a substance that suppresses glycation of a protein by glucose. In some embodiments, a solution containing a substance that suppresses glycation of a protein by glucose may be applied onto the surface of the porous medium by spin coating or the like.

The porous medium may be impregnated with a predetermined amount of solution (solution having a predetermined enzyme titer). This makes it possible to control the enzyme titer of the porous medium (total, per unit area, per unit volume). In the case where the amount of solution absorbed by the porous medium is known, the amount or titer of the enzyme supported on the porous medium can be determined on the basis of the amount of solution absorbed. In some embodiments, a predetermined amount of solution is prepared, and the whole amount of the solution may be absorbed by the porous medium. The amount or titer of enzyme supported on the porous medium can be determined on the basis of the amount of solution prepared.

The amount of enzyme supported on the porous medium may be equal to or greater than, for example, 0.02, 0.03, 0.04, 0.05, 0.06, 0.07, 0.08, 0.09, 0.1, 0.12, 0.14, 0.16, 0.18, or 0.2 unit/mm$^3$ or may be more than the above values. The amount of enzyme supported on the porous medium may be set on the basis of the titer of the enzyme. The medium needs to support the minimum amount of enzyme required for addressing blood having a certain blood sugar level. Therefore, the amount of enzyme supported may be set on the basis of the titer of the enzyme supported.

The amount of enzyme supported by the porous medium may be equal to or smaller than, for example, 0.2, 1, 2, 6, 10, 20, 40, 60, 70, or 80 μg/mm$^3$ or may be less than the above values. The amount of enzyme supported on the porous medium may be set on the basis of the mass of the enzyme supported. When the amount of the enzyme supported is increased, the degree of hydrophobicity of the medium is increased and, consequently, it becomes difficult to absorb blood. Thus, the amount of the enzyme supported may be set on the basis of the actual, physical amount (e.g., the number of moles or grams) of the enzyme.

The above solution may contain a component other than the substance that suppresses glycation of a protein by glucose, such as a cofactor or a colorant.

In some embodiments, the porous medium may be dried at room temperature. The above drying step may include heating. The drying step may also be a non-heating process. The porous medium may also be dried under reduced pressure.

<Device>

The present disclosure also provides a device with which blood plasma is separated and stored. The device includes a porous medium with which blood plasma is separated and stored and a housing that supports or fixes the medium in place. Some examples are described with reference to the attached drawings below. FIGS. 3A to 3D are perspective views of devices according to some embodiments.

Figure 3:
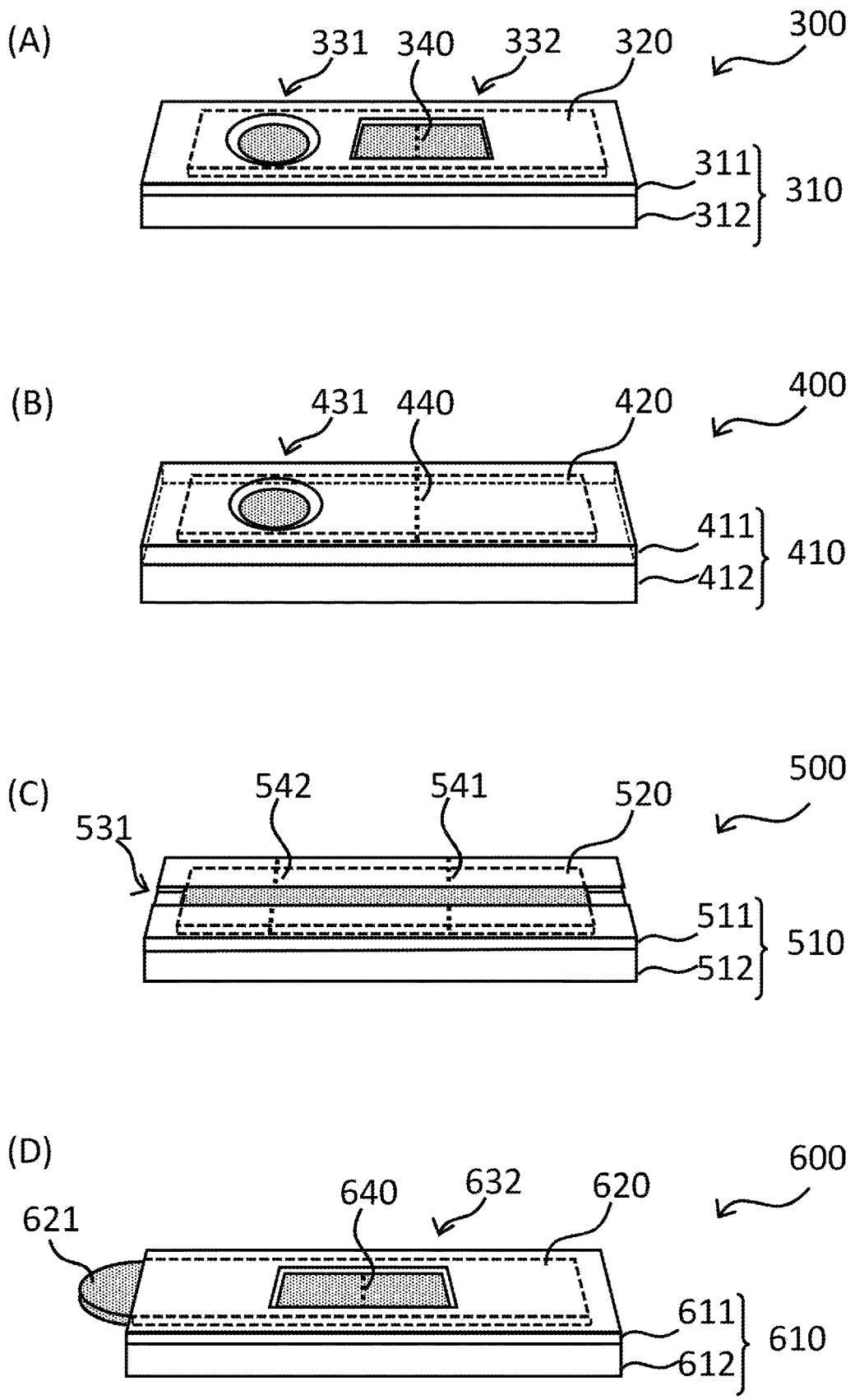
FIGS. 3A to 3D are perspective views of devices according to some embodiments, which include a porous medium.

FIG. 3A is a perspective view of a device 300 according to an embodiment. The device 300 includes a housing 310 and a porous medium 320 supported by the housing 310. The housing 310 includes an upper housing 311 and a lower housing 312, which are combined with each other with the porous medium 320 being fit in the gap formed therebetween. The upper housing 311 has an opening 331 formed therein, through which blood is dropped (introduced). The upper housing 311 further has a window 332 formed therein, through which the front end of the blood or plasma component that flows inside the porous medium 320 is checked.

The window 332 may be a through-hole and may be covered with a transparent material. The window 332 is provided with a judgment line 340 formed therein, which indicates the position (the distance from the opening 331, to which the blood is dropped) of the end of the flowing liquid. The judgment line 340 may be fixed relative to the window 332 and may be fixed onto the surface of the porous medium 320.

FIG. 3B is a perspective view of a device 400 according to an embodiment. The device 400 includes a housing 410 and a porous medium 420 supported by the housing 410. The housing 410 includes an upper housing 411 and a lower housing 412, which are combined with each other with the porous medium 420 being fit in the gap formed therebetween. The upper housing 411 has an opening 431 formed therein, through which blood is dropped (introduced). The upper housing 411 is composed of a transparent material. This makes it possible to check the front end of the blood or plasma component that flows inside the porous medium 420 with a broad view.

The upper housing 411 is provided with a judgment line 440 formed therein, which indicates the position (the distance from the opening 431, to which the blood is dropped) of the end of the flowing liquid. The judgment line 440 may be fixed relative to the upper housing 411 and may be fixed onto the surface of the porous medium 420.

FIG. 3C is a perspective view of a device 500 according to an embodiment. The device 500 includes a housing 510 and a porous medium 520 supported by the housing 510. The housing 510 includes an upper housing 511 and a lower housing 512, which are combined with each other with the porous medium 520 being fit in the gap formed therebetween. The upper housing 511 has a slit 531 formed therein, which is a stripe-shaped opening. It is possible to check the front end of the blood or plasma component that flows inside the porous medium 520 with a broad view. The upper housing 511 has a marking 542 formed on the upper surface thereof, which indicates the position at which blood is dropped (introduced), and a judgment line 541 formed on the upper surface thereof, which indicates the distance from the marking 542.

Figure 4:
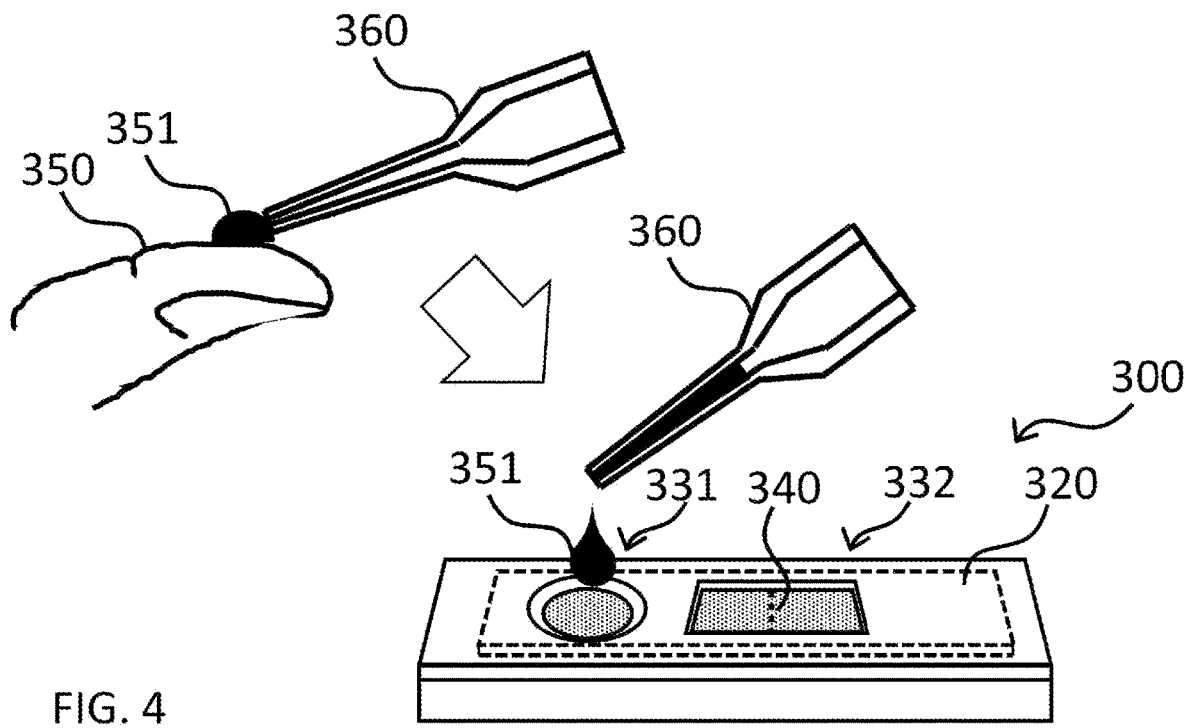
FIG. 4 is a schematic diagram illustrating the use of a device according to an embodiment.

The method of using the devices 300, 400, and 500 illustrated in FIGS. 3A to 3C is briefly described with reference to FIG. 4. In FIG. 4, the device 300 illustrated in FIG. 3A is used for illustrative purpose. Blood 351 is caused to ooze from a body surface 350 of the subject (user) using a puncture instrument, such as a lancet (not shown). The blood 351 is taken with a blood collection instrument 360. Then, the blood 351 contained in the blood collection instrument 360 is dropped into the opening 331 of the device 300. The dropped blood 351 is absorbed by the porous medium 320 at the position of the opening 331 and flows inside the porous medium 320 by capillarity. It is considered that a sufficient amount of the blood 351 has been introduced to the porous medium 320 when a red component reaches the judgment line 340.

FIG. 3D is a perspective view of a device 600 according to an embodiment. The device 600 includes a housing 610 and a porous medium 620 supported by the housing 610. The housing 610 includes an upper housing 611 and a lower housing 612, which are combined with each other with the porous medium 620 being fit in the gap formed therebetween. The porous medium 620 has a protrusion 621. An end of the protrusion 621 is protruded outward from an end of the housing 610. The upper housing 611 has a window 632 formed therein, through which the front end of the blood or plasma component that flows inside the porous medium 620 is checked. In the window 632, a judgment line 640 that indicates the distance from the protrusion 621 is disposed.

Figure 5:
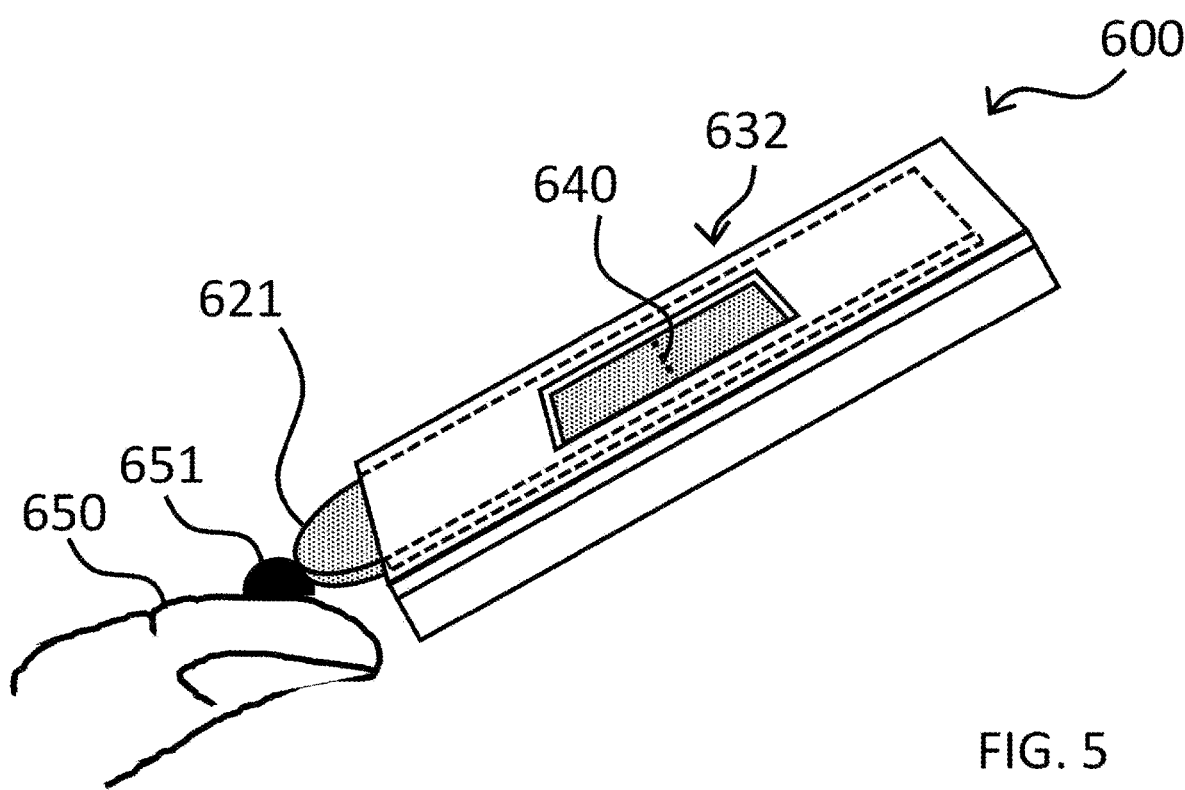
FIG. 5 is a schematic diagram illustrating the use of a device according to an embodiment.

The method of using the device 600 is briefly described with reference to FIG. 5. Blood 651 is caused to ooze from a body surface 650 of the subject (user) using a puncture instrument, such as a lancet (not shown). The protrusion 621 of the porous medium 620 included in the device 600 is brought into contact with the blood. The blood 651 is absorbed by the protrusion 621 and flows inside the porous medium 620 by capillarity. It is considered that a sufficient amount of the blood 651 has been introduced to the porous medium 620 when a red component reaches the judgment line 640.

The present disclosure is not limited to the above examples. The edge of the opening through which blood is dropped may be tapered or vertical. A transparent or non-transparent cover may be openably or detachably attached to the upper surface. The upper housing or the porous medium may be detachably attachable by being slid in the longitudinal or transverse direction of the device.

The housing may have a groove, a protrusion (dot-like, line-like, or wall-like protrusion), or the like formed in the surface that comes into contact with the medium. This reduces, for example, the likelihood of the blood component absorbed by the medium adhering onto the inner surface of the housing and facilitates the flow of the blood component inside the medium.

Figure 6:
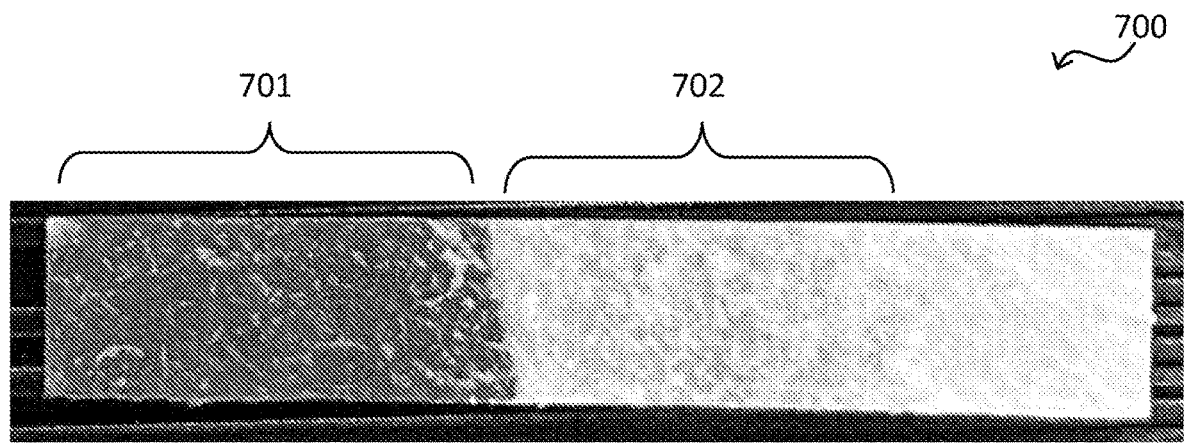
FIG. 6 is an optical photograph that indicates the usage of a filter according to an embodiment.

FIG. 6 is an optical photograph of the filter 700 that was actually used. Whole blood was dropped to the left end of the filter 700. A region 701 in which the blood cell component was captured was observed on the left side of the filter 700. On the right of the region 701, a portion 702 that was a part of the filter 700 which was not reddish but colored (in yellow) was observed. In the region 702, a plasma component from which the blood cell component had been removed was captured.

<Transportation Kit>

The present disclosure also provides a kit with which the plasma component is stored and transported. The kit includes a porous medium and a housing that supports the porous medium or includes a device including the porous medium and the housing in a combined manner. The present disclosure also provides a method for storing or transporting the porous medium or device.

In some embodiments, the kit may include a package that includes the device or porous medium that is to be stored or transported. The package may hermetically seal and include the device or porous medium.

In some embodiments, the kit may include a desiccation component. The desiccation component absorbs moisture present inside the package to reduce humidity or maintain humidity at low levels. The desiccation component may be a silica gel or a fiber material, such as a dry paper sheet. The porous medium may be dried during storage or transportation.

The package may have a structure that avoids blood adhering to an envelope that includes the package, a lid of the package, or the like during mailing. This prevents contamination of the porous medium. The porous medium may be completely dried before being hermetically sealed with the package.

In some embodiments, the kit may include a blood collection instrument. For example, a puncture instrument, such as a lancet, or a blood-collecting vessel may be prepared.

<Post-Transportation Treatment>

In some embodiments, a method for extracting the plasma component from the porous medium is provided. A porous medium that holds the plasma component by storage or transportation is provided. The porous medium may be immersed in a solution. This enables the plasma component held by the porous medium to dissolve in or elute into the solution.

<Mechanical Pretreatment>

In some embodiments, the porous medium including the plasma component may be cut into a portion that includes the blood plasma portion and the other portion (blood cell component). For example, a red portion may be judged visually or with a camera, and the red portion may be cut off from the other portion (portion including the plasma component). A cutting device, such as scissors or a cutter, may be used.

In order to elute the plasma component with the treatment liquid described below with efficiency, the portion of the porous medium which includes the plasma component may be further cut into small pieces. A cutting device, such as scissors or a cutter, may be used. The porous medium may be crushed with a rod-like member into pieces having a certain size. The porous medium may be mashed with a masher.

In some embodiments, the portion of the porous medium which has been separated may be impregnated with a treatment liquid and, subsequently, shaking may be performed. In some embodiments, the portion of the porous medium may be impregnated with a treatment liquid and, subsequently, heating may be performed.

<Treatment Liquid>

In some embodiments, the treatment liquid may be a diluent. The diluent may be used for diluting the sampled liquid. The treatment liquid may be a liquid (pretreatment liquid) with which a predetermined treatment (pretreatment) is performed prior to the measurement of the sampled liquid. The treatment liquid may be either water or an aqueous solution. The treatment liquid may be a buffer solution. The treatment liquid may be, for example, a Good's buffer. The treatment liquid may be a normal saline solution. The treatment liquid may be an organic solvent.

For example, in the case where the measurement target is sensitive to pH or salt concentration, such as proteins, a buffer solution such as a normal saline solution or a Good's buffer may be used. For example, in the case where the treatment target is small molecules, such as amino acid, buffer capacity is not always necessary; in such a case, water, another aqueous solution, or an organic solvent may be used. The treatment liquid may contain an additive, such as a stabilizer or an antiseptic agent. An additive that maintains the structure of a protein or the like may also be used.

In some embodiments, the treatment liquid may contain a stabilizer for the target substance. For example, the treatment liquid may contain a stabilizer for protein structure. The protein may be, for example, but is not limited to, albumin. For example, the structure of albumin can be stabilized using the stabilizer. The use of the stabilizer enables index molecules, such as BCP (bromocresol purple), to be specifically bonded to predetermined positions. In the case where conditions of electric charge and amino acid side chains in the bonding positions or in the vicinity thereof are suitable, it becomes easy to bond index molecules or the like to proteins and, furthermore, the specificity can also be maintained. Examples of the stabilizer for proteins include, but are not limited to, a saccharide, a polysaccharide, and a salt.

The treatment liquid may contain a substance (coagulant) that causes a substance included in the target liquid to aggregate. For example, the target liquid may contain a coagulant that causes specific substances selected from fine dust particles, blood cells, membrane proteins, oil particles, and the like to aggregate. The above substances may be aggregated into large clusters. The clusters formed by aggregation can be readily removed in the subsequent filter treatment.

The treatment liquid may contain a substance that causes decomposition, solubilization, or aggregation of a substance or inhibits or facilitates the reaction of a substance.

The component of the treatment liquid may be selected from the group consisting of a normal saline solution, HEPES, TES, MES, tricine, a sodium carbonate buffer solution, TBS, and PBS. The component of the treatment liquid may contain a Good's buffer (e.g., HEPES, TES, MES, or tricine). The treatment liquid may contain a reference material that is used in the subsequent measurement. The treatment liquid may be pure or ultrapure water.

The present disclosure provides a method for measuring the properties of a protein, such as glycated albumin level (GA level). In some embodiments, the concentrations of albumin and/or glycated albumin in the eluate from the stored or transported porous medium, which is described in the present disclosure, may be measured. In some embodiments, a GA level may be determined on the basis of the concentrations of albumin and glycated albumin measured.

A glass fiber filter (LF1/F487-14 Cytiva) capable of separating blood cells was cut into small pieces having a width of 4 mm and a length of 30 mm.

A certain amount of AMANO enzyme glucose oxidase (GO "AMANO" AM, 226 U/mg) was weighed and dissolved in ultrapure water to prepare a 2.5-mg/mL aqueous solution (GOx solution). To a 4 mm×30 mm LF1 filter, 27 μL of the GOx solution was added. Subsequently, drying was performed at room temperature overnight. The resulting filter was used as a glycation suppression filter (GOx-supported filter). The amount of GOx supported on the above filter was about 0.5 unit/mm$^3$ and about 2.25 μg/mm$^3$. On the other hand, a 4 mm×30 mm LF1 filter (GOx-unsupported filter) that did not include GOx supported thereon was used directly as a control.

A high GA-HSA solution was prepared by reacting HSA (human serum albumin, Wako Pure Chemical Industries, Ltd.) with glucose at a high concentration. The above solution was mixed with HSA that was not subjected to the glycation reaction to prepare an adjusted HSA liquid having an ALB concentration of 4.43 g/dL, a GA concentration of 0.83 g/dL, a GA % of 19.29%, and a glucose concentration of 200 mg/dL.

Then, 5 μL of the adjusted HSA liquid was absorbed by the ends of the GOx-supported filter and the GOx-unsupported filter with a micropipette. The above filters were left to stand at room temperature and dried.

Then, 1, 2, 3, 5, and 10 days later, albumin was eluted from each of the filters by the following method. First, a buffer solution containing 150-mM NaCl and 10-mM HEPES was prepared as a treatment liquid. The portion (region 702 in FIG. 6) of each of the filters which did not include the blood cell component was cut into small pieces having a width of 2 mm, which were charged into a 1.5-mL tube. To the tube, 100 µL of the HEPES buffer solution was added. Subsequently, shaking was performed for 30 minutes at 1800 rpm at room temperature. Hereby, a measurement sample was prepared.

The concentrations of glycoalbumin (GA) and total albumin (ALB) in each of the samples were measured using a glycoalbumin measurement reagent "LUCICA (registered trademark) GA-L" (Asahi Kasei Pharma Corporation) and an automated analyzer ("DM-JACKEx+", Minaris Medical Co., Ltd.).

Figure 7:
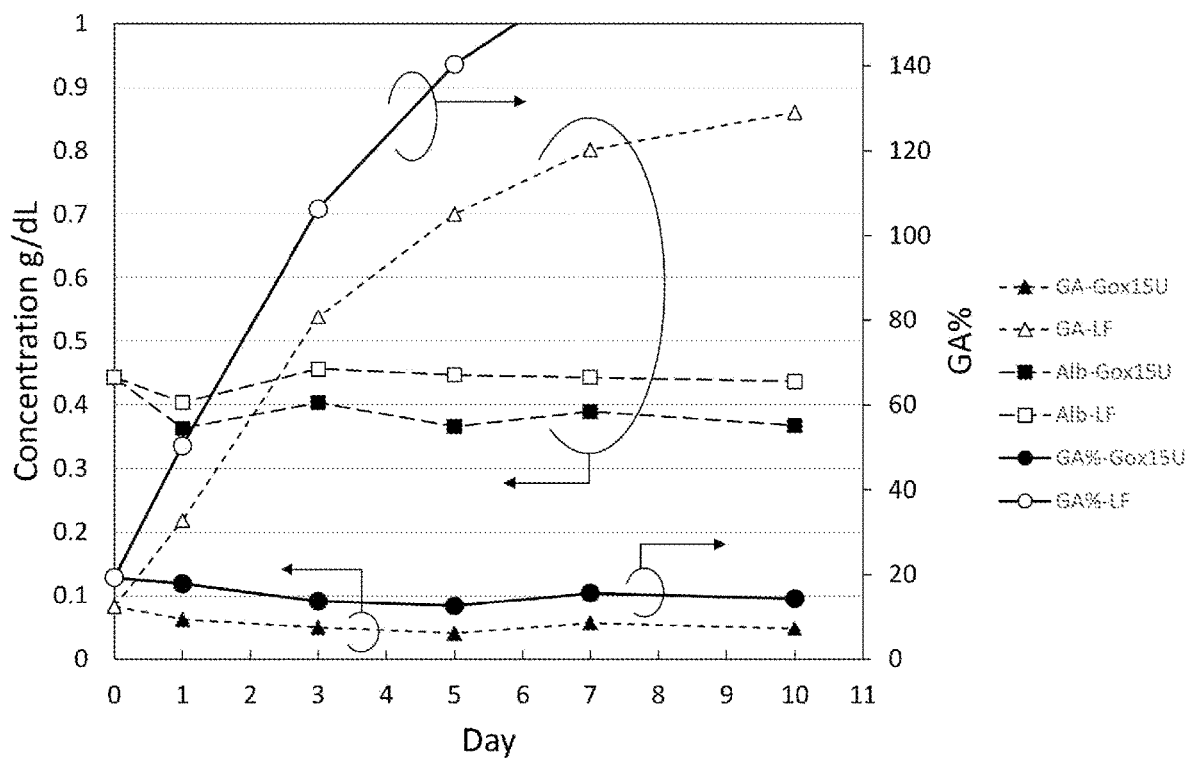
FIG. 7 includes graphs illustrating changes in the GA concentration, ALB concentration and GA % with time which occurred when a GOx-supported filter according to an embodiment and a comparative GOx-unsupported filter were caused to absorb an adjusted HSA solution.

FIG. 7 illustrates changes in the concentrations of ALB (rough broken line) and GA (fine broken line) captured by the GOx-supported filter ("GOx15U") and the GOx-unsupported filter ("LF") and GA % (solid line) over a period of time from the day on which they were captured to the 10th day. The ALB concentration was substantially constant until the 10th day in either case where the GOx-supported filter ("GOx15U"; solid rectangle) or GOx-unsupported filter ("LF", blank rectangle) was used. This confirms that the ALB concentration substantially did not change with time.

In contrast, there was a great difference in the GA concentration between the two samples. In the case where the GOx-unsupported filter ("LF") was used (blank triangle), the measured GA concentration increased from day to day. This indicates that the concentrations of albumin and glucose present in the adjusted HSA liquid were increased as a result of drying, the likelihood of albumin and glucose coming into contact with each other was increased accordingly, and, consequently, glycation of albumin by glucose was facilitated. On the other hand, in the case where the GOx-supported filter ("GOx15U") was used (solid triangle), the measured GA concentration was substantially constant. This indicates that, since GOx digested glucose included in the adjusted HSA liquid, glycation of albumin by glucose was not facilitated even when the albumin concentration was increased as a result of drying.

GA % is calculated by dividing GA concentration by ALB concentration. In the case where the GOx-unsupported filter ("LF") was used (blank circle), GA % increased from day to day and exceeded 100% on the 3rd day. One of the reasons is presumably as follows. Albumin has a plurality of glycation sites. Among these, some sites are easily glycated, while others are hardly glycated. It is considered that, when the glucose concentration is relatively low, the site that is most easily glycated (Lys525 is considered the site) is glycated and, when the glucose concentration is increased, the other sites are also glycated. That is, the higher the glucose concentration, the larger the number of glycated amino acids per albumin molecule. It is considered that, since the above measurement was conducted with a relatively low GA % (e.g., 40% or less), in the case where a plurality of glycation sites were glycated, the number of count of them was increased and, consequently, GA % was a false high value. Note that this is merely an interpretation; different interpretations may be possible. At least, it is considered that the reason for which the GA % exceeded 100% is that the degree of glycation was excessively increased as a result of drying and lapse of time. As described above, it was found that, in the case where the GOx-unsupported filter is used, it becomes impossible to accurately measure GA % with lapse of time.

In contrast, in the case where the GOx-supported filter ("GOx15U") was used (solid circle), the GA % was substantially constant until the 10th day. That is, the GOx-supported filter suppressed the acceleration of glycation subsequent to absorption of blood. Thus, it was confirmed that the use of the GOx-supported filter enables GA % to be measured in a relatively accurate manner even in the case where blood is mailed or transported from the place in which blood is sampled to a distant place or the case where a certain amount of time has been lapsed since sampling of blood.

The present disclosure also provides the following embodiments.

A001

A medium with which blood serum or plasma is separated and stored, the medium including:
  a porous medium for separation of blood plasma; and
  a substance supported on the porous medium, the substance that suppresses glycation of a protein by glucose.

A011

The medium according to Embodiment A001,
  wherein the porous medium is a fiber medium or a porous polymer (polymer porous body).

A012

The medium according to Embodiment A001,
  wherein the porous medium is composed of a substance selected from the group consisting of cellulose, a glass fiber, a hollow fiber, cotton, nitro cellulose, and a polysulfone.

A013

The medium according to Embodiment A012,
  wherein the porous medium is substantially formed of a glass fiber medium.

A014

The medium according to any one of Embodiments A001 to A013,
  wherein the porous medium is capable of substantially separating blood plasma.

A015

The medium according to any one of Embodiments A001 to A014,
  the medium being capable of filtering a substance having a size of 3 µm or greater.

A016

The medium according to any one of Embodiments A001 to A015,
  the medium being capable of filtering a substance having a size of 1 µm or greater.

A017

The medium according to any one of Embodiments A001 to A016,
  the medium being capable of filtering a substance having a size of 0.1 µm or greater.

A021

The medium according to any one of Embodiments A001 to A017,
  wherein the substance that suppresses glycation of a protein by glucose includes glucose oxidoreductase.

A022

The medium according to any one of Embodiments A001 to A021,
  wherein the substance that suppresses glycation of a protein by glucose includes an enzyme selected from the group consisting of glucose oxidase, glucose dehydrogenase, and glucokinase.

A023

The medium according to Embodiment A021 or A022,
  wherein the substance that suppresses glycation of a protein by glucose further includes a cofactor.

A031

The medium according to any one of Embodiments A001 to A023, wherein the substance that suppresses glycation of a protein by glucose is supported on an inner surface of the porous medium.

A032

The medium according to any one of Embodiments A001 to A023,
wherein the substance that suppresses glycation of a protein by glucose is supported on an outer surface of the porous medium.

A033

The medium according to any one of Embodiments A001 to A032,
wherein glucose oxidase is supported on the porous medium at 0.04 unit/mm$^3$ or more.

A034

The medium according to Embodiment A033,
wherein glucose oxidase is supported on the porous medium at 0.1 unit/mm$^3$ or more.

A035

The medium according to Embodiment A034,
wherein glucose oxidase is supported on the porous medium at 0.2 unit/mm$^3$ or more.

A036

The medium according to any one of Embodiments A001 to A035,
wherein glucose oxidase is supported on the porous medium at 10 μg/mm$^3$ or less.

A037

The medium according to Embodiment A036,
wherein glucose oxidase is supported on the porous medium at 6 μg/mm$^3$ or less.

A038

The medium according to Embodiment A037,
wherein glucose oxidase is supported on the porous medium at 2 μg/mm$^3$ or less.

A041

The medium according to any one of Embodiments A001 to A038,
the medium further including catalase supported on the porous medium.

A042

The medium according to any one of Embodiments A001 to A041,
the medium further including ketoamine oxidase (e.g., fructosyl-amino acid oxidase (FAOD)) supported on the porous medium.

A043

The medium according to any one of Embodiments A001 to A042,
the medium further including a blood clotting inhibitor supported on the porous medium.

A051

The medium according to any one of Embodiments A001 to A043,
the medium further including a colorant supported on the porous medium.

A061

The medium according to any one of Embodiments A001 to A051,
wherein a first section of the porous medium, the first section being capable of holding a separated plasma component, and
a second section of the porous medium, the second section being capable of holding a blood cell component, are defined, and
the entirety of the second section is separable from another section including at least a part of the first section.

A101

A medium with which blood plasma is separated and stored, the medium including:
a first porous medium for separation of blood plasma; and
a second porous medium arranged to come into contact with the first porous medium, the second porous medium being provided with a substance supported thereon, the substance that suppresses glycation of a protein by glucose.

B001

A method for producing a medium with which blood plasma is separated and stored, the method including:
providing a porous medium capable of separating blood plasma;
providing a solution (e.g., glucose oxidase solution) containing a substance that suppresses glycation of a protein by glucose;
applying the solution to the porous medium; and
drying the porous medium on which the solution is deposited.

B011

The method according to Embodiment B001,
wherein the applying the solution to the porous medium includes impregnating the porous medium with the solution.

B012

The method according to Embodiment B001,
wherein the applying the solution to the porous medium includes applying the solution onto a surface of the porous medium.

B021

The method according to any one of Embodiments B001 to B012,
wherein the substance that suppresses glycation of a protein by glucose includes an enzyme selected from the group consisting of glucose oxidase, glucose dehydrogenase, and glucokinase.

B022

The method according to Embodiment B021,
wherein the solution further includes a cofactor for the enzyme.

B031

The method according to any one of Embodiments B001 to B022,
wherein the impregnating the porous medium with the (glucose oxidase) solution includes causing the porous medium to absorb a predetermined amount of the (glucose oxidase) solution.

B032

The method according to any one of Embodiments B001 to B031,
wherein the drying includes heating the porous medium including the enzyme solution absorbed therein.

C001

A device with which blood plasma is separated and stored, the device including:
the porous medium according to any one of Embodiments A001 to A101; and
a housing that supports the porous medium.

C011

The device according to Embodiment C001,
wherein the housing includes an opening through which blood is dropped and a window through which an amount of blood dropped is checked.

C021
The device according to any one of Embodiments C001 to C011,
wherein the window is provided with a marking formed in or inside the window, the marking indicating an amount of sample.

C022
The device according to Embodiment C021,
wherein the marking is one or a plurality of judgment lines arranged at predetermined distances from the opening.

C023
The device according to Embodiment C021 or C022,
wherein the marking is printed on a surface of the porous medium or fixed to the window.

D001
A kit with which a blood component is stored or transported, the kit including:
the device according to any one of Embodiments C001 to C023; and
a package configured to contain the device.

D011
The kit according to Embodiment D001,
wherein the package is arranged to hermetically seal and include the device.

D021
The kit according to Embodiment D011, the kit further including a desiccation component.

D031
The kit according to any one of Embodiments D001 to D021,
the kit further including a blood collection instrument.

E001
A method for measuring a glycated albumin level (GA level), the method including:
providing a porous medium with which blood plasma taken from a specimen has been separated and stored;
eluting a plasma component from the porous medium into a solution;
measuring concentrations of albumin and glycated albumin in the eluate containing the plasma component; and
determining a GA level on the basis of the concentrations of albumin and glycated albumin.

E011
The method according to Embodiment E001,
wherein the causing a plasma component included in the porous medium to dissolve in a solution includes
cutting off a section of the porous medium, the section holding a blood cell component, and
immersing a remaining section of the porous medium in a solution, the remaining section holding at least the plasma component.

Some embodiments and examples of the present disclosure have been described above. It should be noted that the embodiments and examples above are illustrative of the present disclosure. For example, each of the embodiments has been described in detail in order to explain the present disclosure in a way easy to understand. Dimensions, structures, materials, and circuits may be added and changed as needed. Embodiments obtained by combining one or a plurality of the above-described features of the present disclosure with one another are also within the scope of the present disclosure. The claims cover various modifications of the embodiments without departing from the technical ideas of the present disclosure. Thus, it should be understood that embodiments and examples disclosed in the present specification are merely illustrative and not restrictive of the scope of the present disclosure.

The invention claimed is:

1. A medium for separating blood plasma from blood or from a solution derived from blood and for storing the separated blood plasma, the medium comprising:
a first porous medium configured to separate blood plasma from blood or from a solution derived from blood and to store the separated blood plasma, the first porous medium comprising dry catalase supported on the first porous medium and a dry substance supported on the first porous medium wherein the dry substance is effective to suppress glucose induced protein glycation.

2. The medium according to claim 1 wherein the first porous medium is a fiber medium or a porous polymer.

3. The medium according to claim 2 wherein the first porous medium is composed of a cellulose material, a glass fiber, a hollow fiber, a cotton material, a nitro cellulose material, or a polysulfone material, or a combination thereof.

4. The medium according to claim 1 wherein the dry substance includes a glucose oxidoreductase.

5. The medium according to claim 4 wherein the dry substance further includes a cofactor.

6. The medium according to claim 1 wherein the first porous medium further comprises an inner surface comprising the dry substance supported on the inner surface.

7. The medium according to claim 1 wherein the porous medium further comprises an outer surface comprising the dry substance supported on the outer surface.

8. The medium according to claim 1 wherein the first porous medium further comprises glucose oxidase supported on the first porous medium at a glucose oxidase concentration between 0.2 and 10 μg/mm$^3$.

9. The medium according to claim 1 wherein the first porous medium further comprises a ketoamine oxidase supported on the first porous medium.

10. The medium according to claim 1 wherein the first porous medium further comprises a blood clotting inhibitor supported on the first porous medium.

11. The medium according to claim 1, wherein the first porous medium comprises a plasma separation section configured to hold a separated plasma component and an enzyme supporting section configured to hold a blood cell component wherein the plasma separation section includes one or more plasma separation section parts and the enzyme supporting section is configured to detach from the one or more plasma separation section parts.

12. The medium according to claim 1 further comprising:
a second porous medium.

13. A device for separating blood plasma from blood or from a solution derived from blood and for storing the separated blood plasma, the device comprising:
the medium according to claim 1; and
a housing comprising the first porous medium disposed within the housing.

14. The device according to claim 13, wherein the housing includes an opening through which blood can be dropped and a window through which an amount of blood dropped can be checked.

15. The device according to claim 14, wherein the window has one or a plurality of judgment lines arranged at predetermined distances from the opening.

16. A kit for storing and transporting a blood component, the kit comprising:
the device according to claim 13; and
a package arranged to include the device.

17. The kit according to claim 16, further comprising a desiccation component or a blood collection instrument or both.

18. The medium according to claim 1 wherein the first porous medium is composed of a cellulose material, a glass fiber, a hollow fiber, a cotton material, a nitro cellulose material, or a polysulfone material, or a combination thereof, and wherein the dry substance includes a glucose oxidoreductase.

19. The medium of claim 18 wherein the first porous medium further comprises a blood clotting inhibitor supported on the first porous medium.

20. The medium according to claim 18, wherein the glucose oxidoreductase is supported on the first porous medium at a glucose oxidoreductase concentration between 0.2 and 80 µg/mm$^3$.

* * * * *